United States Patent Office 3,324,606
Patented June 13, 1967

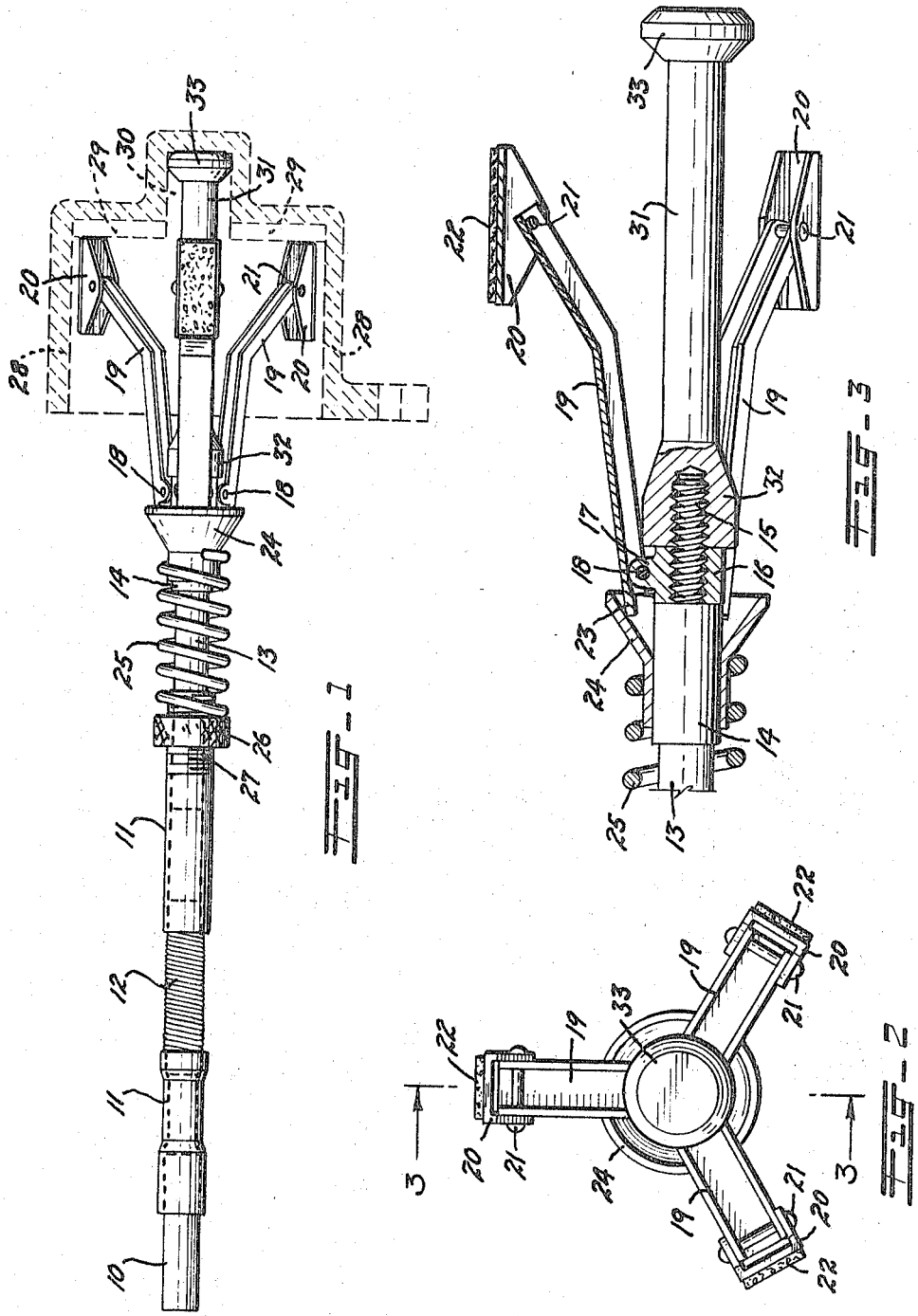

3,324,606
CYLINDER HONING TOOLS
James T. Clark, Fort Morgan, Colo., assignor to Clark-Feather Mfg. Co., Fort Morgan, Colo.
Filed Jan. 18, 1965, Ser. No. 426,057
2 Claims. (Cl. 51—346)

This invention relates to cylinder honing tools more particularly of the type illustrated in applicant's prior Patent No. 2,778,168 which was issued Jan. 22, 1957. Tools of this type are designed to be mounted in the chuck of a rotary drill and inserted in a cylinder to hone the internal surface of the latter by means of circumferentially-travelling hone stones. Such a tool operates very satisfactorily in cylinders, both ends of which are open so as to allow the hone stones to travel longitudinally the full length of the cylinder.

Present master brake cylinders on automotive vehicles, however, have closed head extremities provided with indented flow passages and with an axially positioned indented socket. If a rotating cylinder honing tool be inserted in such a cylinder the hone stones accidentally engage and become entangled with the indented passages often resulting in complete destruction of the tool and damage to the cylinder..

The principal object of the present invention is to provide a cylinder honing tool having means which will prevent the tool from being inserted into a cylinder in excess of a predetermined and pre-set distance so as to prevent damaging engagement between the hone stones and cylinder head passages and indentations, and yet which will allow the cylindrical walls to be honed for their entire longitudinal length.

Certain types of master brake cylinders are provided with axial sockets in the permanent head extremities of the cylinders. Another object of this invention is to provide a cylinder hone tool which will make use of this socket to maintain the tool concentric with the cylinder as it rotates therein.

A further object is to provide an attachment for limiting the degree of insertion of a honing tool and for maintaining the tool in a concentric position and to so construct the attachment that it can be quickly and easly applied to conventional cylinder honing tools when desired for use.

Other objects and advantages reside in the detail construction of the invention, which is designed for simplicity, economy, and efficiency. These will become more apparent from the following description.

In the following detailed description of the invention, reference is made to the accompanying drawings which forms a part hereof. Like numerals refer to like parts in all views of the drawing and throughout the description.

In the drawing:

FIG. 1 is a side view of a cylinder honing tool with this invention incorporated therein and with the position of a master brake cylinder of the closed end type shown in broken line;

FIG. 2 is an enlarged front end view of the honing tool; and

FIG. 3 is a similarly enlarged fregmentary longitudinal section of the forward extremity of the tool taken on the line 3—3, FIG. 2.

The tool illustrated comprises a chuck stud 10, to be chucked in the chuck of an electric drill, which is connected in any suitable manner, to a tubular coupling 11 by means of a length of flexible shafting 12. A tool shaft 13 is fixedly mounted in the forward extremity of the coupling 11 and extends axially forward from the latter. The tool shaft 13 is formed, adjacent its forward extremity, to provide an enlarged guide portion 14 and an integral, forwardly projecting, threaded stud 15.

A spider hub 16 is threaded onto the threaded stud 15 against the guide portion 14 allowing the stud to project forwardly from the hub 16. The spider hub is provided with radially projecting ears 17, each of which is drilled to receive a fulcrum rivet 18. A hone arm 19 is pivotally mounted on each fulcrum rivet 18 and extends forwardly and outwardly therefrom.

A hone support 20 is tiltably secured on the forward extremity of each hone arm by means of a hinge rivet 21 and an elongated hone stone 22 is cemented or otherwise mounted on the outer face of each hone support 20. A lever portion 23 is formed on and projects rearwardly from each hone arm 19 into internal engagement with a cone member 24 which is longitudinally slidable on the guide portion 14 of the tool shaft 13. The cone member 24 is constantly urged against the lever portions 23 by means of a compression spring 25 surrounding the shaft 13 and abutting against a spring-compression-adjusting nut 26 which is threaded upon threads 27 formed on the tubular coupling 11.

It can be seen that if the hone arms 19 are compressed together for insertion in a cylinder for honing purposes the cone member 24 will be forced rearwardly to compress the spring 25 and when the arms are released in the cylinder the hone stones 22 will be forced outwardly and resiliently against the cylinder wall by expansion of the spring 25. The degree of expansion can be adjusted by changing the position of the nut 26.

On FIG. 1 a master brake cylinder is shown, in cross section and in broken line, at 28. Such cylinders have indented flow passages 29 and a piston rod socket 30 indented in their closed ends. If the cylinder hone, as above described, is inserted and rotated in the cylinder 28, it is possible that one or more of the hone supports 20 will engage and catch in the indented flow passages 29 so as to stop rotation of the arms 19 and throw the tool shaft eccentric of the cylinder resulting in destruction of the tool and damage to the cylinder wall.

This possibility of damage is avoided in the hone of this invention by the use of an extension rod 31 formed with an enlarged internally-threaded base portion 32 at its rear extremity, adapted to be threaded onto the stud 15 against the spider hub 16, and a circular guide head 33 at its forward extremity. The extension rod 31 is predesigned for use in a master brake cylinder such as indicated at 28 in FIG. 1. That is, the diameter of the guide head 33 is such as will allow it to be inserted in the rod socket 30 and rotated without play therein to maintain the honing tool concentric. The length of the extension rod 31 is such that it will contact the bottom of the rod socket 30 when the hone supports 20 reach the bottom of the cylinder 28 and before the hone supports engage in the indented flow passages 29, as illustrated in FIG. 1.

Thus it can be seen that the cylinder honing tool can be quickly adapted for use in specific closed end cylinders by simply screwing the proper extension rod 31 on the projecting extremity of the stud 15 and can be quickly adapted for use in open ended engine cylinder by simply removing the extension rod from the stud 15.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A cylinder honing tool comprising: a tool shaft; a threaded stud formed on the forward extremity of said tool shaft; a spider hub threaded onto said stud, the stud projecting forwardly from the hub; hone arms pivotally mounted on said spider hub and projecting forwardly and outwardly therefrom in radial planes; a hone element tiltably mounted on the forward extremity of each hone arm; means for urging said hone arms resiliently outward; and an extension rod threaded at its rear extremity on the projecting extremity of said threaded stud and projecting axially forward to a position beyond the extreme forward position of said hone elements.

2. A cylinder honing tool as described in claim 1 having an enlarged, circular guiding head formed on said extension rod for insertion in an axially positioned socket in a closed-end cylinder for maintaining said honing tool concentric of said cylinder.

References Cited

UNITED STATES PATENTS

| | | | |
|---|---|---|---|
| 321,735 | 7/1885 | Lindsly | 287—125 X |
| 1,576,593 | 3/1926 | Froussard | 51—353 |
| 1,818,491 | 8/1931 | McFadden | 51—353 |
| 2,778,168 | 1/1957 | Clark | 51—332 |
| 3,005,294 | 10/1961 | Kushmuk | 51—353 |

ROBERT C. RIORDON, *Primary Examiner.*

D. G. KELLY, *Assistant Examiner.*